INVENTOR
FERDINAND KLUMPP, JR.
BY
Auslander + Thomas
Attorneys

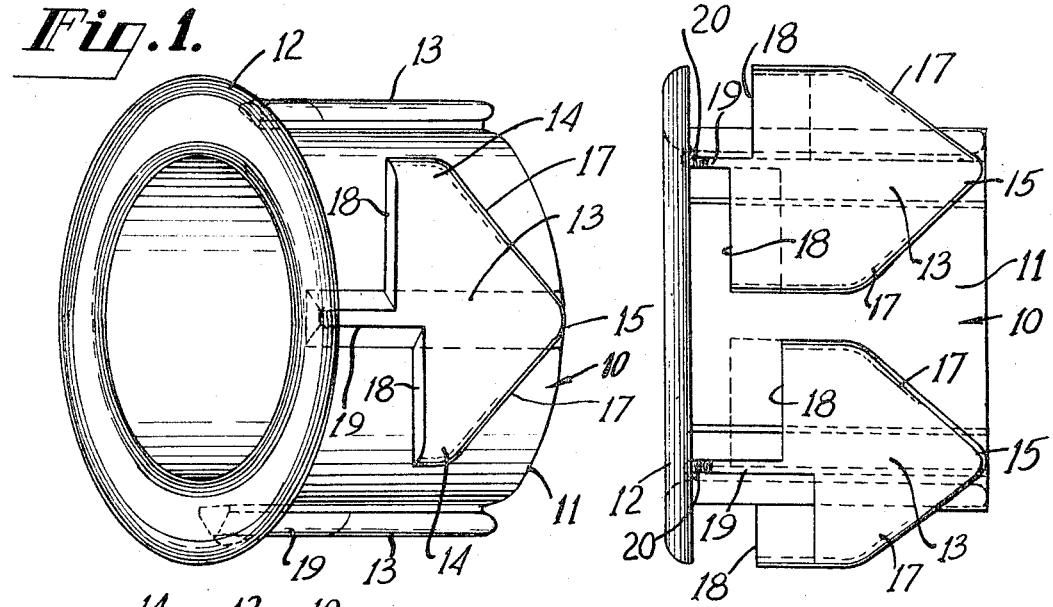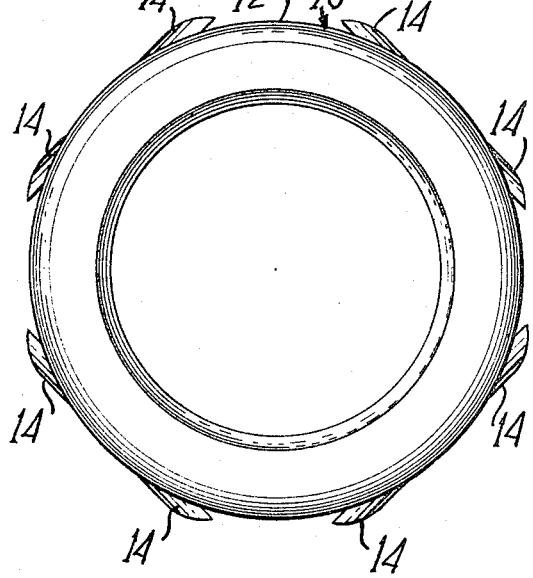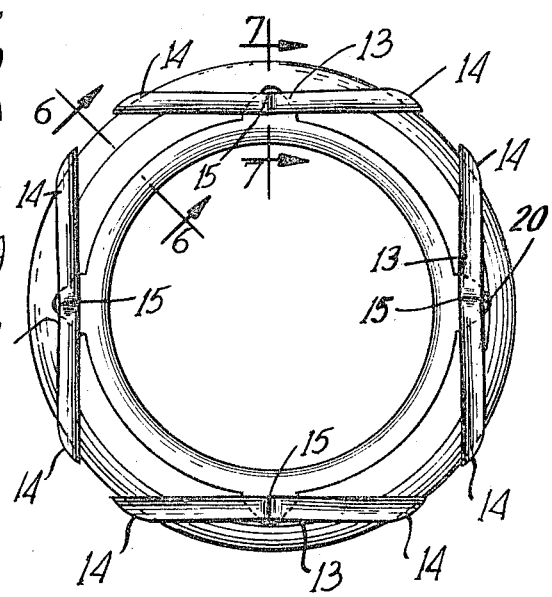

!# United States Patent Office 3,397,280
Patented Aug. 13, 1968

3,397,280
SELF-LOCKING GROMMET
Ferdinand Klumpp, Jr., Mountainside, N.J., assignor to Heyman Manufacturing Company, Kenilworth, N.J., a corporation of New Jersey
Filed Aug. 24, 1967, Ser. No. 662,922
3 Claims. (Cl. 174—153)

ABSTRACT OF THE DISCLOSURE

The present invention provides a self-locking grommet of relatively hard insulating material which will accommodate itself to panels of varying thicknesses. The grommet generally comprises a body member having a flange on one end adapted to engage one side of an apertured panel and, a plurality of oppositely disposed wing-like members integral with the outer surface of the body adapted to be flexed towards the body as it passes through the aperture. Each of the wing members has oppositely disposed flexible portions the end lengths of which opposite the flange portion lie in a plane parallel to the plane of the flange and equidistantly spaced therefrom with various of the end lengths of the flexible wing members positioned at different spaced distances from the flange. Ribs extend from the wing-like locking members to the base of the flange and include thereon a substantially raised surface area behind the flange to prevent rotatable and/or lateral movement of the grommet. The wing-like members are preferably provided in pairs and tapered towards a triangular shaped point allowing for ready insertion of the grommet within the panel aperture.

*Cross reference*

Ser. No. 496,880 of Ferdinand Klumpp, Jr., filed Oct. 18, 1965, for Self Locking Grommet—abandoned before the filing of the present application.

The present invention relates to a self locking bushing or grommet.

In instances where electrical conductors, cables, tubing and the like pass through apertures in plates or panels it is desirable both in providing additional insulation and for protecting the periphery of such elements that the periphery be shielded from the edge of the aperture which is oftentimes of metal and rough cut or having sharp edges.

Various devices have been provided for such support and protection, and they have generally taken the form of grommets of dielectric material which are adapted to be inserted within the aperture in the panel and retained therein.

Early devices employed in this field were generally constructed of a soft insulating material, such as rubber. The general flexible nature of the entire grommet body made such grommet easily displaceable. Such grommets were also generally expensive to manufacture. Later, hard insulating materials such as molded plastics of various kinds were employed, however, by their nature such devices were less flexible than prior devices and while they could be readily emplaced within a panel aperture, locking of the grommet to prevent both undesired removal and rotation was problemsome.

Various locking devices for such grommets were employed, such as providing the grommet with outwardly extending resilient fingers which were formed in the walls of the grommet, and were stepped at different distances from the collar or flange of the grommet, with the fingers engaging a side of the panel opposite the flange engagement on the opposite side of the panel. Such a grommet is shown in my U.S. Patent No. 2,424,757. While this resilient finger grommet provided a marked advance in the art and provided a self locking grommet which was adaptable for use with panels of varying thicknesses, such grommet has certain inherent deficiencies.

Grommets of this nature are relatively expensive of manufacture and cannot be molded with a simple mold. Further, because the fingers are formed by cutting out slots along the side of the grommet itself, the conductor or conductors passing through the grommet are not fully enclosed or insulated from the panel by a continuous insultating wall.

In order to overcome the foregoing, various other self-locking arrangements were developed for panel aperture inserts. Such devices included grommets having integral fin-like members projecting tangentially from the body of the grommet. These members were adapted to spring outward after insertion within and through the panel aperture holding in conjunction with the grommet's flanged head, the grommet from axial displacement from the panel aperture.

While such arrangement was a step forward in the art, it still did not overcome all of the difficulties. While the panel insert was held against axial displacement from the panel aperture, the panel insert was somewhat freely rotatable within the panel aperture. Additionally, a positive lock within the panel aperture was not assured. The abutment of the fins with the rear portion of the panel aperture was effected by having the edges of opposed fin members sloped in a delta-like manner and upon insertion, especially where the panel width was thick, the fin members did not snap back to their original position, but rather only resiliently returned to a point where a portion of the edge of the slope angularly abutted the rear of the panel, and in the event a force was applied rotatably and outwardly in the direction of the flanged head portion, the panel insert could become dislodged.

According to the present invention there is provided a self locking grommet of relatively hard insulating material, which is adaptable for molding in simple molds, and which will accommodate itself to panels of varying thicknesses and provides a positive lock upon insertion.

The grommet of the present invention generally provides a body member having a flange at one end adapted to engage one side of an apertured panel and a plurality of oppositely disposed wing-like members integral with the outer surface of the body. The wing-like membres are flexed toward the body member in passing through the aperture. Each of the wing members has oppositely disposed flexible portions. The end length of each of the flexible wing members opposite the flanged portion is along a parallel plane with the flange and equidistantly spaced therefrom, with various of the end lengths of the flexible wing members positioned at different spaced distances from the flange. Ribs extend from the wing-like locking members to the base of the flange and include thereon a substantially raised surface area behind the flange to prevent rotatable or lateral movement of the grommet.

The wing-like members are preferably provided in pairs and tapered towards a triangular shaped point allowing for the ready insertion of the grommet within the panel aperture.

Although such novel feature or features believed to be characteristic of the invention are pointed out in the claims, the invention and the manner in which it may be carried out may be further understood by reference to the description following and the accompanying drawings.

FIG. 1 is a perspective view showing a grommet according to the present invention.
FIG. 2 is an end view of the grommet of FIG. 1.
FIG. 3 is a side elevation of the grommet of FIG. 1.
FIG. 4 is an opposite end view of FIG. 2.

Referring now to the figures in greater detail, where like reference numbers denote like parts in the various figures.

Figure 5:
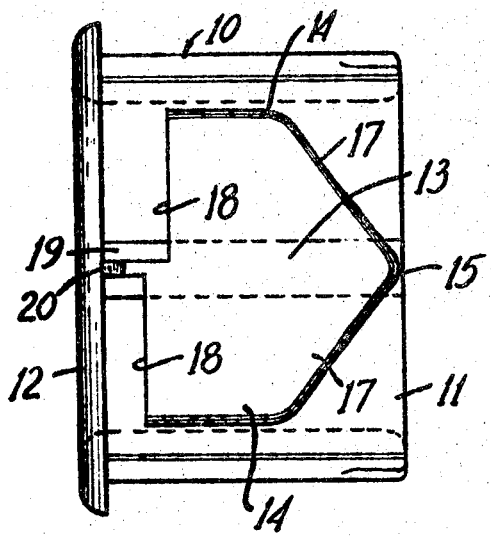
FIG. 5 is a side elevation of FIG. 1 turned 90° with respect to FIG. 3.
Figure 6:
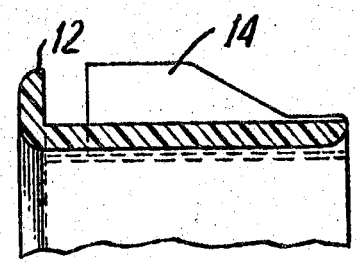
FIG. 6 is a sectional view taken along lines 6—6 of FIG. 4.
Figure 7:
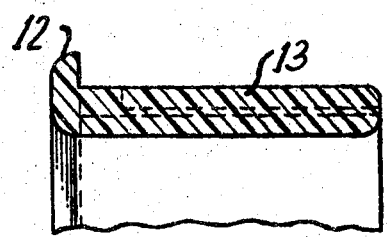
FIG. 7 is a sectional view taken along lines 7—7 of FIG. 4.

The grommet 10 of the present invention generally comprises a body portion 11 which is usually tubular so as to be readily adaptable to fit within the generally circular aperture found in a panel.

A flange 12 is provided at one end of the body portion 11 and in use the flange 12 abuts one surface of panel into which the grommet 10 is inserted.

Positioned around and integral to the body portion 11 are one or more wing-like locking members 13, the locking members 13 extending tangentially and longitudinally along the body portion 11. The wing-like locking members 13 include flexible wing portions 14.

It is preferable that the winged portions 14 be paired, although a single wing 14 configuration is adaptable for use. A pair of winged portions 14 form the wing-like member 13 and terminate at a point 15 to act as a leading portion as the wing portions 15 are advanced through an aperture in a panel. The wing portions 14 flex inwardly and parallel to the axis of the grommet 10. By angularly tapering the rearward facing edges and sides 17 of the winged portions 14, the winged portions 14 are guided through the aperture with a minimum of resistance.

Each of the end lengths 18 of each of the winged portions 14 lies in a plane parallel to and equidstant along its entire length from the plane of the flange 12. The end lengths 18 are spaced at different distances from the flange 12 so that different thickness panels may be engaged between the flange 12 and the appropriate end length 18. The spacing-apart from the flange 12 of the end lengths 18 is preferably arranged so as to have end lengths 18 on oppositely disposed sides of the body portion 11 equal to provide good locking action.

A rib 19 extends from each wing-like locking member to the flange 12. A nib 20 is provided along the length of the rib 19 near the point of junction of the rib 19 and the flange 12 so as to provide a raised surface to the rib 19 behind the flange 12. The nib 20 acts as a lock against lateral and/or rotational movement of the grommet 10 when mounted within the panel aperture, the nibs 20 in conjunction with the wing locking maintaining contact between the grommet body 11 and the panel on both sides of the panel opening.

Figure 8:
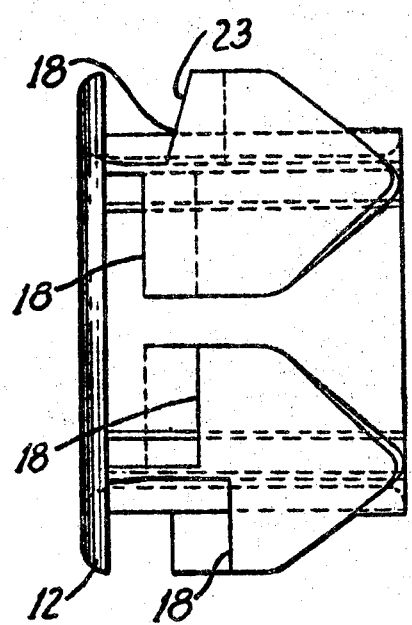
FIG. 8 is a side elevation of another embodiment of a grommet of the present invention.
Figure 9:
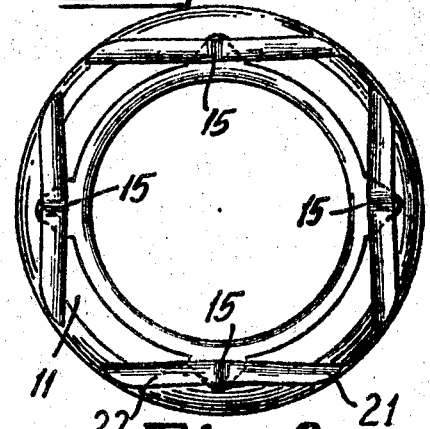
FIG. 9 is an end view of another embodiment of a grommet of the present invention.

While as shown in FIGS. 1-8 the winged portion 14 may extend beyond the periphery of the flange 12, as shown in FIG. 9 a sufficient spacial distance to effect a locking is provided by shorter wings 21 which do not extend beyond the periphery of the flange 12. In this manner a greater number of wing-like members 22 may be disposed along the body portion 11 without the problem of overlapping of the tip ends of the winged portions 14, 22 where a plurality are employed.

As shown in FIG. 8 one or more of the end lengths 18, but preferably only one of the end lengths 18 may have a taper configuration 23. In this manner panel widths which fractionally differ from the spacial positioning of the flange 12 and end length 18 will not deter a firm locking of the grommet 10 within the panel aperture. Upon insertion of the grommet 10 into the panel aperture one of the end lengths 18 of the wing portions 14 will pass outward of the panel, resiliently assume its tangential juxtaposition to the body portion 18 and thus maintain the grommet 10 within the aperture. The tapered portion 23 while not completely released since its entire surface did not pass through the panel aperture, will, at least at its tip end project tangentially away from the body portion 11 and act as a stop, which, in combination with the positive lock effected by the aforementioned end length 18, will securely lock the grommet within the panel opening. In use the grommet 10 is readily insertable providing a positive lock in panel against both axial and lateral and or rotational movement.

The terms and expressions which are employed are used as terms of description; it is recognized, though, that various modifications are possible within the scope of the invention claimed.

Having thus described certain forms of the invention in some detail, what is claimed is:

1. A self-locking grommet comprising a tubular body member having a continuous wall therethrough, a flange at one end of said body adapted to engage one side of an apertured panel, a plurality of oppositely disposed wing-like members integral with and extending tangentially and longitudinally along said body, each of said wig-like members having oppositely disposed flexible wing portions, the end length of each of said flexible wing portions opposite said flange lying along a plane parallel with the plane of said flange and equidistantly spaced therefrom, each of said wing-like members including a rib extending from said wing portions to the base of said flange, each of said ribs including a nib thereon, said nib raised with respect to the surface of said rib, and a plurality of said end lengths spaced at different distances from said flange, whereby said wing portions flex towards said body when said body passes through a panel aperture and at least one of said end lengths is adapted to flex outwardly to lock said grommet between at least one of said wing portions, said flange and said nib.

2. The grommet of claim 1 wherein each said wing-like members includes a pair of said wing portions and each said wing portion pair is tapered to form a substantially triangular configuration, the apex of said triangular configuration adapted to act as a leading portion as said wing-like members are advanced through said panel aperture.

3. The grommet of claim 1 further including at least one additional wing-like member, said wing-like member including oppositely disposed flexible wing portions, the end length of one of said flexible wing portions opposite said flange being tapered.

References Cited

UNITED STATES PATENTS

| | | | |
|---|---|---|---|
| 2,424,757 | 7/1947 | Klumpp | 174—153 |
| 3,001,007 | 9/1961 | Klumpp et al. | 174—153 |
| 3,164,054 | 1/1965 | Biesecker | 174—153 |
| 3,217,319 | 11/1965 | Rueger. | |

LARAMIE E. ASKIN, *Primary Examiner.*